United States Patent Office 3,422,167
Patented Jan. 14, 1969

3,422,167
METHOD FOR PREPARING METAL OXIDE MICROSPHERES
Richard A. Bowman, Oak Ridge, Tenn., and Roger L. Pilloton, Berkeley Heights, N.J., assignors to the United States of America as represented by the United States Atomic Energy Commission
No Drawing. Filed Jan. 31, 1968, Ser. No. 701,872
U.S. Cl. 264—.5       5 Claims
Int. Cl. B22d 23/08; B29c 23/00

ABSTRACT OF THE DISCLOSURE

Metal oxide gel microspheres of alumina, zirconia, hafnia, europia, thoria, urania, plutonia, and mixtures thereof formed by jetting a corresponding metal oxide sol into a freezing medium, are frozen, subsequently dehydrated by vacuum distillation after removal of the freezing medium, and calcined into fired products.

BACKGROUND OF THE INVENTION

The sol-gel method for preparing metal oxide microspheres is well known. It briefly consists of forming gel droplets by injecting the metal oxide sol into a setting medium, removing the water content by some extracting medium and thereafter drying and calcining the gelled microspheres to dense products. These processes have been applied, with slight variation, to urania, plutonia, thoria, zirconia, etc., and mixed oxides. Moreover, the final products have ranged in size from powders (~44 microns) upward to 1000 microns microspheres. These prior art processes have, however, some disadvantages which include: the lengthy processing time, particularly in view of the required slow heating during the drying and calcining steps; and the product may contain an undesirable quantity of organic material as a result of the dehydration step.

SUMMARY OF THE INVENTION

The object of this invention, which is to provide a more rapid process for the preparation of metal oxide microspheres of alumina, zirconia, hafnia, europia, thoria, urania, plutonia, and mixtures thereof, is achieved by the discovery that gel droplets of these metal oxides, which were formed by dispersing a corresponding metal oxide sol into a freezing medium, could be frozen and subsequently dehydrated by vacuum distillation into green microspheres. The green microspheres were found to have sufficient strength to permit handling and were readily calcined into dense metal oxide microspheres. Advantageously, the green microspheres may be placed immediately in a furnace at a calcination temperature, for example, of 1500°–1800° C. without any deleterious results, thus obviating the inordinately slow heat-up required in the prior art methods. Moreover, the calcined microspheres were essentially free of contaminants, such as carbon, which are characteristically found in conventionally processed calcined microspheres.

DESCRIPTION OF THE INVENTION

In carrying out the process, the metal oxide microspheres can be prepared from various metal oxide sols. Nonlimiting examples of such metal oxide sols which are useful for nuclear reactor purposes are (1) Group IV metal oxides, such as zirconia and hafnia, (2) the actinide metal oxides such as thoria, urania, plutonia, etc., and mixtures thereof, and (3) the IV-F rare earth metal oxides such as samarium, europium, gadalinium. Additionally, other metal oxides of Group III, such as alumina, which is useful as a catalyst, are intended to be within the scope of the invention. The methods for preparing these metal oxide sols are well known. One method for preparing urania sols is, for example, disclosed in U.S. Patent 3,288,717 issued on Nov. 29, 1966, in the name of Leon E. Morse. There, hydrous urania is precipitated from an aqueous uranous nitrate solution at a pH of 6.0 to 7.3 under a nonoxidizing atmosphere, filtered, washed and peptized by heating to form the sol. While the metal oxide sol can vary widely in its properties, it is necessary, for purposes of this invention, that it be stable and have suitable viscosity, which will permit dispersion into droplets. At sol concentrations above about 5 molar, the sol viscosity becomes greater, making droplet formation more difficult; moreover, aging of the sol tends to produce a similar result. In this respect, actinide metal oxide sols, for example, having concentrations of from 1 to 5 molar and 5 to 10 centipoises, are quite satisfactory.

The method of the invention may be carried out in conventional equipment. One such embodiment comprises an insulated vessel which contains a cooling medium. A closed vessel which holds a freezing medium is submerged in the cooling medium and it is, in turn, provided with a transverse porous support plate about midway its length to collect the frozen microspheres and keep them from collecting on the bottom of the vessel. Applicants have found that a mixture of Dry Ice and acetone is quite suitable as a cooling medium, and for the freezing medium any stable, low-boiling refrigerant such as trichloroethylene. A hypodermic needle is mounted at the top of the closed vessel and extends downward to the top of the freezing medium. A dip tube or suitable conduit, which is connected to a vacuum pump, is extended to the bottom of the vessel for removal of the freezing medium.

By this arrangement the metal oxide sol is first jetted from the hypodermic into the freezing medium to form droplets which subsequently freeze into hard microspheres. This method of dispersing the metal oxide sol into droplets is conventional and has been quite satisfactory for dispersing sol droplets of various diameters, ranging from powder size (submicron) to millimeter size (~1000 microns). For this, the size of the droplets generally depends upon such process parameters as sol flow rate, sol viscosity, and opening diameter.

The frozen microspheres gradually sink in the freezing medium until they contact the transverse support plate and are collected there. This freezing step is rapid, requiring only from two to five seconds for thoria droplets of 200–300 microns.

The freezing medium is then removed from the vessel by applying a slight vacuum to the dip tube. Thereafter a vacuum, such as about $1 \times 10^{-4}$ torr, is applied to the vessel to dehydrate the microspheres by sublimation. The time required to complete dehydration of the microspheres will vary, depending upon the amount of the freezing medium remaining in the vessel, the temperature, etc.; the time, for example, for dehydration was found to be faster at $-11°$ C. than at $-22°$ C., requiring from one to six hours for completion.

After dehydration, the microspheres have sufficient green strength that they may be removed and placed in a tray for insertion in a calcining furnace. Although a preheat of about 300° C. for an hour is preferred, no deleterious results occur if the microspheres are placed immediately in a furnace at calcination temperature of 1500°–1800° C. While lower temperatures such as 1100°–1300° C. may be employed in calcining the microspheres, the final density of the microspheres increases, for the same initial sol concentration, as the calcination temperature increases. Thus, where thoria microsphere densities (employing a 3 M thoria sol) of 1.5 g./cc. were obtained at a calcining temperature of 1300° C., thoria microsphere densities (employing a 4.0 M thoria sol) of 6.5 g./cc. were obtained at a calcining temperature of 1800° C.

While the product microspheres are quite uniform in size and are essentially free of contaminants, the resultant microsphere densities are about 50–60% of theoretical. If desired, the microsphere densities could be increased by contacting the microspheres with a solution of a selected fuel material, such as thorium, uranium, plutonium, zirconium, etc., to effect adsorption of the fuel material from solution. The microspheres could then be refired to fix the additives as a metal or oxide, thus increasing the final density.

Having disclosed the invention in a general fashion the following examples are provided to indicate with greater particularity the process parameters and techniques.

Example I

The feasibility of processing a thoria sol into product microspheres by a freeze-dry method was established employing the apparatus hereinbefore described as follows: ~3 mls. of a 3.01 M thoria sol were jetted through a No. 21 hypodermic needle into a vessel which contained 100 mls. of trichloroethylene and was maintained at −22° C. in a Dry Ice-acetone bath, forming sol droplets of approximately 300 microns. These droplets froze into hard microspheres and were collected on a support plate mounted midway of the vessel, requiring from two to five seconds to complete the freezing phase.

The trichloroethylene was then removed by vacuum means and the microspheres vacuum dried for about 4 hours at $1 \times 10^{-4}$ torr. A portion of the green microspheres was then calcined at 1300° C. for about 3 hours and the product microspheres examined.

The microspheres, which had an average density, as determined by weight and volume measurements, of 1.5 g./cc. (theoretical density of about 10 g./cc.), were quite uniform in size and were found to contain essentially no contaminants.

The remaining green microspheres were calcined at 1800° C. for 1 hour and the resulting product microspheres examined. The product microspheres were uniform in size, essentially free of contaminants and had an average density of 3.6 g./cc.

Example II

Sol droplets were formed in trichloroethylene maintained at −22° C. as in Example I, except that a 4.0 M sol was used. A portion of the microspheres was vacuum dried and calcined at 1300° C. The resulting product microspheres were uniform in size, essentially free of contaminants, and had an average density of 3.7 g./cc.

The remaining green microspheres were calcined at 1800° C. for about 1–2 hours and were uniform in size and had an average density of 6.5 g./cc.

It will be observed from the results of this example, as well as Example I, that the product density was significantly increased as the sol concentration and the calcination temperature were increased.

The above examples are merely illustrative and are not to be understood as limiting the scope of the invention which is limited only as indicated by the appended claims.

What is claimed is:

1. A method for preparing metal oxide microspheres selected from the group consisting of alumina, zirconia, hafnia, europia, thoria, urania, plutonia, and mixtures thereof comprising the steps of jetting a fine stream of said metal oxide as a sol into trichloroethylene to thereby form and simultaneously freeze said droplets, dehydrating the resulting frozen droplets, and thereafter calcining the dehydrated droplets at a temperature above 1100° C.

2. The method of claim 1 wherein said dehydration step is effected by sublimation at a vacuum of $1 \times 10^{-4}$ torr.

3. The method of claim 1 wherein the concentration of said metal oxide sol is 4 M.

4. The method of claim 1 wherein said trichloroethylene is maintained at −22° C.

5. The method of claim 1 wherein said sol droplets comprise 44 to 1000 micron diameter thoria.

References Cited

UNITED STATES PATENTS

| | | | |
|---|---|---|---|
| 2,552,323 | 5/1951 | Kimberlin | 34—5 X |
| 2,893,102 | 7/1959 | Maxwell et al. | 34—5 X |
| 2,969,294 | 1/1961 | Shyne | 34—5 X |
| 3,218,726 | 11/1965 | Muir | 34—5 |
| 3,281,371 | 10/1966 | Nerge et al. | 252—301.1 |

CARL D. QUARFORTH, *Primary Examiner.*

M. J. SCOLNICK, *Assistant Examiner.*

U.S. Cl. X.R.

252—301.1; 264—15; 34—5; 23—344, 345, 354, 143, 140, 18